United States Patent
Shemer et al.

(10) Patent No.: US 11,914,866 B2
(45) Date of Patent: Feb. 27, 2024

(54) OPTIMIZED ONE PASS DELTA STREAMING FILTER

(71) Applicant: EMC IP Holding Company LLC, Hopkinton, MA (US)

(72) Inventors: Jehuda Shemer, Kfar Saba (IL); Ravi Vijayakumar Chitloor, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/452,411

(22) Filed: Oct. 27, 2021

(65) Prior Publication Data

US 2023/0131627 A1 Apr. 27, 2023

(51) Int. Cl.
*G06F 3/06* (2006.01)
*G06F 11/14* (2006.01)

(52) U.S. Cl.
CPC .......... *G06F 3/0619* (2013.01); *G06F 3/0644* (2013.01); *G06F 3/0659* (2013.01); *G06F 3/0673* (2013.01); *G06F 11/1451* (2013.01); *G06F 11/1469* (2013.01)

(58) Field of Classification Search
CPC .... G06F 3/0619; G06F 3/0644; G06F 3/0659; G06F 3/0673; G06F 11/1451; G06F 11/1469
USPC ................................................. 711/162, 161
See application file for complete search history.

(56) References Cited

U.S. PATENT DOCUMENTS

| | | | |
|---|---|---|---|
| 6,578,120 B1* | 6/2003 | Crockett | G06F 11/2082 714/6.23 |
| 6,715,030 B1* | 3/2004 | Vandenbergh | G06F 3/0653 711/170 |
| 7,702,670 B1 | 4/2010 | Duprey et al. | |
| 8,335,771 B1 | 12/2012 | Natanzon et al. | |
| 8,620,973 B1 | 12/2013 | Veeraswamy et al. | |
| 8,849,764 B1 | 9/2014 | Long et al. | |
| 8,862,546 B1 | 10/2014 | Natanzon et al. | |
| 8,874,508 B1 | 10/2014 | Mittal | |
| 9,218,251 B1 | 12/2015 | Hemashekar et al. | |
| 9,529,885 B1 | 12/2016 | Natanzon et al. | |
| 10,140,039 B1 | 11/2018 | Baruch et al. | |
| 10,176,183 B1 | 1/2019 | Shim et al. | |
| 10,725,967 B1 | 7/2020 | Natanzon et al. | |
| 10,838,923 B1 | 11/2020 | Menezes et al. | |
| 2005/0033828 A1* | 2/2005 | Watanabe | G06F 11/2074 714/E11.107 |
| 2011/0225359 A1 | 9/2011 | Kulkarni et al. | |
| 2013/0103650 A1 | 4/2013 | Natanzon et al. | |
| 2014/0025714 A1 | 1/2014 | Reyntjens | |
| 2017/0083412 A1 | 3/2017 | Mamluk et al. | |
| 2018/0329636 A1 | 11/2018 | Dornemann et al. | |
| 2019/0243683 A1 | 8/2019 | Botelho | |
| 2019/0251286 A1 | 8/2019 | Desai et al. | |
| 2019/0332781 A1 | 10/2019 | Natanzon | |

(Continued)

*Primary Examiner* — David Yi
*Assistant Examiner* — Zubair Ahmed
(74) *Attorney, Agent, or Firm* — Workman Nydegger (57) ABSTRACT

One example method includes performing delta operations to protect data. During a delta operation, a primary map and a secondary map are processed using bit logic. The bit logic determines how to handle data stored at a location on the volume associated with an entry in the primary map and included in the current delta operation when a new write for the same location is received as the corresponding entry in the primary map is processed.

18 Claims, 6 Drawing Sheets

(56) References Cited

U.S. PATENT DOCUMENTS

2021/0034244 A1    2/2021   Ausarkar et al.
2021/0406133 A1   12/2021   Shemer et al.
2022/0147541 A1    5/2022   Mallipeddi et al.

* cited by examiner

OPTIMIZED ONE PASS DELTA STREAMING FILTER

FIELD OF THE INVENTION

Embodiments of the present invention generally relate to data protection operations including backup operations. More particularly, at least some embodiments of the invention relate to systems, hardware, software, computer-readable media, and methods for data protection operations, including backup operations with low recovery point objective (RPO).

BACKGROUND

Backup operations are often performed using snapshot technologies. Generally, a snapshot of data is a copy of the data at a particular point in time. Performing a snapshot operation, however, can impact performance of a computing system because of the need to stun or quiesce the computing system. Snapshots, including snapshots used with virtual technologies, are used to freeze the virtual machine for data protection purposes. The IO (Input/Output) interruption caused by taking a snapshot may limit the number of snapshots that can be performed in a given time period. Stated differently, some backup technologies may suffer from an RPO that is too large. Improvements are needed to further reduce RPO when protecting data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations. More particularly, at least some embodiments of the invention relate to systems, hardware, software, computer-readable media, and methods for data protection operations including near continuous data protection operations, delta operations. backup operations, replication operations, and the like.

Example embodiments of the invention relate to a backup operation that can reduce RPO for data protection to seconds. Embodiments of the invention are described in the context of virtual machines (VMs), but can be implemented using containers, physical machines, and the like or in situations where IOs (Input/Outputs) can be intercepted in flight.

Snapshot operations are performed by stunning or quiescing a virtual machine (or other device/system) and then taking a snapshot of the virtual machine (or its volumes). Stunning the virtual machine, however, interrupts the performance of the virtual machine and the associated 10. As a result, the RPO for snapshot operations for a virtual system or machine can be on the order of hours in order not to disrupt the virtual system in a way that may impact system responsiveness.

Snapshots can be improved by taking differentials or deltas (referred to herein as deltas). A delta relates to changes that have occurred since a previous operation, such as a previous delta operation. Deltas are distinct from a full snapshot, but allow a backup to be created for a specific point in time. The point in time backup can be generated by combining one or more deltas and/or a base snapshot or base backup. Generating conventional deltas, however, is complex and requires both a significant number of bitmaps and a data log that stores some of the changes associated with the deltas. These bitmaps and data log are needed at least to manage the IOs that may occur after a command to perform a backup or delta operation has been received. Although deltas can reduce the RPO compared to the RPO of full snapshots, conventional deltas are complex to generate and manage. Further, performing conventional deltas requires multiple passes of the relevant bitmaps and related volumes and/or logs. Embodiments of the invention thus relate to improved deltas and improved delta operations.

Embodiments of the invention include a one-pass mechanism that allows the RPO to be reduced to the order of seconds and uses two maps. Embodiments of the invention, by way of example only, may reduce the RPO to 10 seconds or less, 5 seconds, or less, or the like. By reducing the RPO to the order of seconds, a continuous or near continuous stream of deltas can be exported to enable near continuous data protection (CDP). The deltas can be generated at a cadence of a few seconds. Each delta may include changes to a virtual machine or the virtual machine's volumes since a previous operation. Because each delta represents a point in time, deltas separate by a few seconds provide near continuous protection.

Embodiments of the invention generate deltas using a filter. A splitter is not required to generate deltas according to embodiments of the invention. Generating deltas without a splitter reduces overhead, reduces complexity, but still allows RPO to be reduced to the order of seconds.

Embodiments of the invention are discussed with reference to bitmaps. A bitmap is an example of a map. Other maps used to track changes or for other purposes may include, by way of example only, a list, a linked list, an array, or the like. Any structure that allows an area of a volume or disk to be marked as changed may be used in embodiments of the invention.

Figure 1:
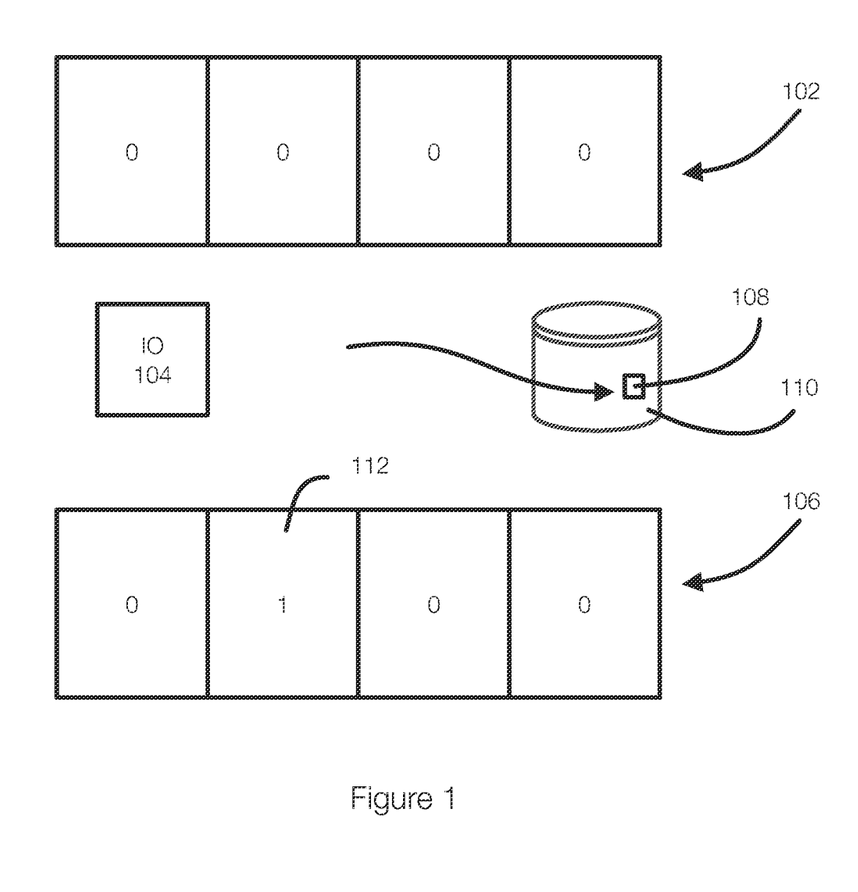
FIG. 1 discloses aspects of change block tracking for data protection operations.

FIG. 1 discloses aspects of a changed bit tracking (CBT) bitmap. The bitmap 102, in this example, includes a plurality of entries. Each entry corresponds to an extent on the volume 110. Each extent corresponds to a portion of the volume 110. The extents can be of any desired size. When data is written to the volume 110, however, the data is not necessarily the same size as the extent. Thus, a single write may involve one or more extents. However, the bitmap 102 tracks dirty areas based on extents regardless of IO size in some embodiments. In one example, the bitmaps may include dirty and clean bits. A dirty bit represents that the corresponding extent or location has changed and needs to be backed up. A clean bit represents that the corresponding extent or location has not changed and does not need to be backed up. The following discussion considers a bit set to 1 to be a dirty and a bit set to 0 to be clean. However, a 0 could represent a dirty area and a 1 could represent a clean area.

When an IO 104 is received and being written to a location (or address) 108 on the volume 110, the bitmap 102 is marked. More specifically, the entry in the bitmap 102 corresponding to the extent that includes the location 108 is marked. The bitmap 106 is an example of the bitmap 102 after writing the IO 104 to the volume 110. In the bitmap 106, the entry 112 has been marked (e.g., set to 1).

By marking the entry 112, it is understood that the extent corresponding to the entry 112, which includes the location 108, is dirty (not yet backed up). When a backup operation is performed, it is only necessary to backup the extents corresponding to the marked entries in the bitmap 106. When generating a delta during a delta operation, the extents corresponding to the marked entries in the bitmap are transferred together as a delta or as a differential.

More specifically, each entry in the bitmap 102 represents a fixed size extent (e.g., 64 KB) and each entry in the bitmap 102 corresponds to a different extent. Thus, the first entry in the bitmap 102 corresponds to the first extent in the volume 110. The second entry in the bitmap 102 corresponds to the second extent in the volume 110, which is usually adjacent to the first extent. The index of the bit or entry in the bitmap 102 correlates to a corresponding extent in the volume 110.

When the IO 104 only overlaps with a portion of an extent, the corresponding entry in the bitmap 102 is still marked. When the IO 104 is written to the volume 110, the location to which the IO 104 is written may overlap with more than one extent. Thus, a single IO 104 may result in more than one bit being set in the bitmap 102. The relationship between the bitmap 102 and the volume 110 may depend on the size of the bitmap and the size of the volume 110.

For example, a bitmap having a size of 256 KB (2 M bits) and a volume size of 64 TB means that each bit represents an extent of 32 MB. Smaller volumes mean that each bit (assuming the same bitmap size) represents a smaller extent size. By way of example and not limitation, extent sizes, for a 256 KB bitmap and typical volume sizes, are between 8 KB and 128 KB.

Figure 2:
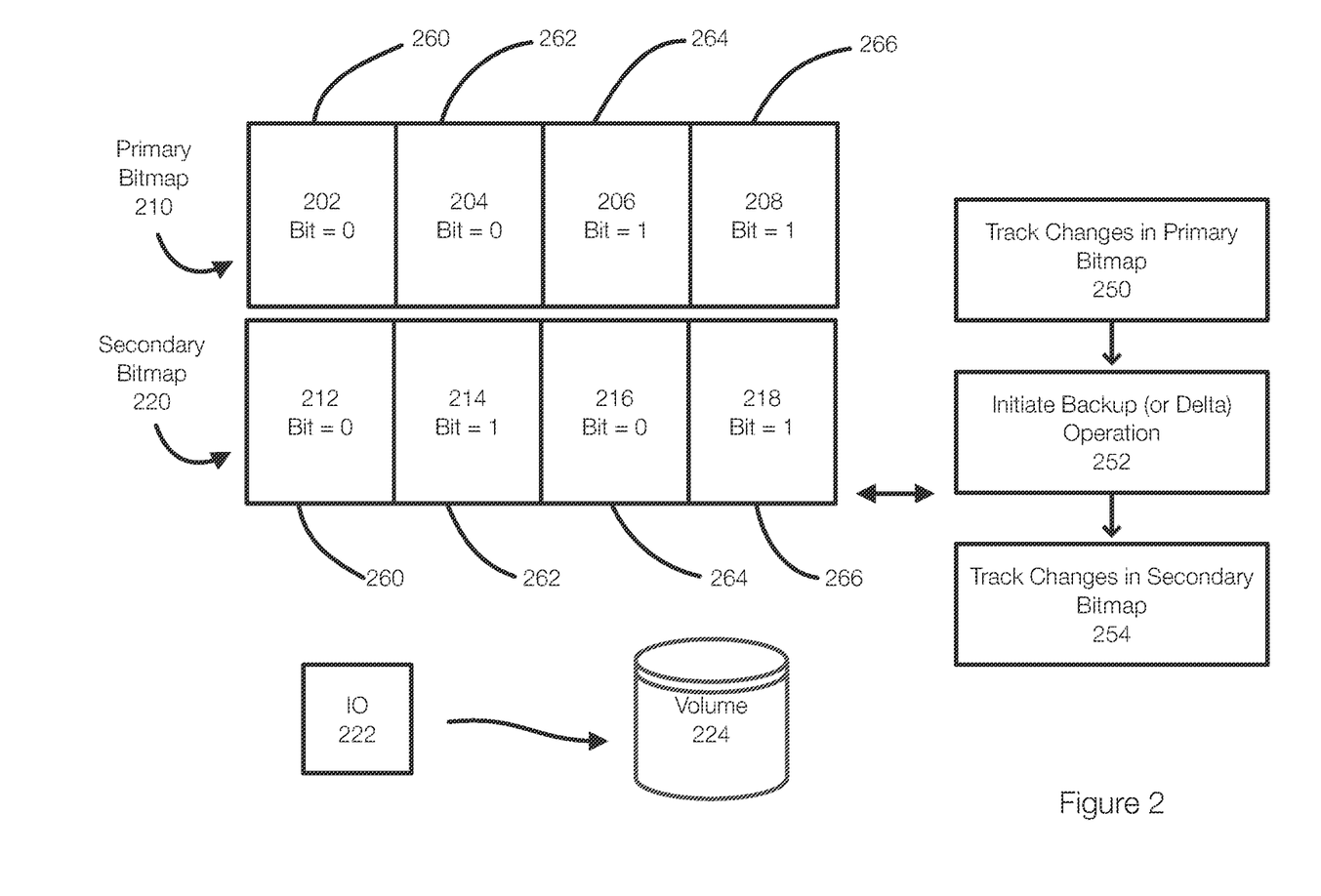
FIG. 2 discloses aspects of bit logic performed during data protection operations including delta operations.

FIG. 2 discloses aspects of bit-level logic used when generating deltas for transmission to a target site or other consumer. Generally, FIG. 2 illustrates a primary bitmap 210 and a secondary bitmap 220. The primary bitmap 210 is tracking changes to the volume 224 since a last backup or delta operation in this example.

This example illustrates the logic that is applied to an IO 222 in the context of generating deltas. The IO 222 is processed based on the status of the relevant bits in the primary bitmap 210 and the secondary bitmap 220. The relevant bits depend on the address of the IO 222 or the extents to which the IO 222 is written. The delta includes a copy of the extents that are marked in the primary bitmap 210 and thus include changes to the volume 224. Copies of these extents, which includes changes since the previous delta operation, are included in the delta and transmitted for storage.

In this example, changes are tracked 250 in the primary bitmap 210. Each time an IO 222 is sent to the volume 224, the appropriate bit (or bits) is marked in the primary bitmap 210. When a backup or delta operation is initiated 252, new changes to the volume 224 are tracked in the secondary bitmap 220. Thus, the primary bitmap 210 is frozen in time with respect to new IOs once the command for a delta operation is received or initiated. Once the delta is generated and processed, the secondary bitmap 220 becomes the primary bitmap and changes are tracked until another backup or delta operation is initiated. Then a new secondary bitmap is generated or the original primary can be used as the secondary bitmap.

Thus, incoming IOs are marked in the primary bitmap 210. When a backup is requested, the bit logic is applied to subsequent IO. More specifically, the bit logic is applied to the entries in the primary and secondary bitmaps corresponding to the location of the incoming IO. If an IO impacts more than one bit, each pair of bits in the primary and secondary bitmaps are considered independently. There are four possibilities as illustrated by the primary bitmap 210 and the secondary bitmap 220. The four possibilities are (primary bitmap, secondary bitmap) or (0,0), (1,0), (0,1), and (1,1).

Each of these possibilities is represented in the bitmaps 210 and 220. The bitmaps 210 and 220 represent 4 different extents and each extent represents one of these scenarios.

If the IO 222 is received for a location in an extent corresponding to the index 260 after the delta operation is initiated, the bits are (0,0) as indicated by bit 202 and 212. Because the bit 202 is zero, this indicates that the IO 222 is not included in the delta being generated. In other words, the extent corresponding to the index 260 is not dirty and does not need to be included in the delta being generated. Because the bit 212 in the secondary bitmap is 0, the bit 212 is changed to a 1 or marked in the secondary bitmap 220. The IO 222 then proceeds to the volume 224. This ensures that the extent corresponding to the index 260 in the secondary bitmap 220 will be included in the subsequent delta.

The next scenario is when the IO 222 is received for the extent associated with the index 262. In this scenario, the bit 204 is 0 and the bit 214 is 1—(0,1). Because the bit 204 is 0, this indicates that the extent corresponding to the index 204 is not included in the delta being generated. Because the bit 214 is a 1, the IO is allowed to proceed. Even if the IO 222 in this scenario is writing to an extent that has already received a write, the goal is to identify extents that need to be copied during the next delta operation using the secondary bitmap 220.

The next scenario is when the IO 222 is received for the extent associated with the index 264. In this scenario, the bit 206 is a 1 and the bit 216 is a 0—(1,0). Because the bit 206 is a 1, this indicates that the extent associated with or identified by the index 264 in the primary bitmap 210 is included in the delta being generated. As a result, a copy on write is performed. More specifically, the bit 216 in the secondary bitmap 220 is marked or set to a 1 and the data in the relevant extent is read from the volume 224 and included in the delta. Then, the IO 222 is written to the volume 224 and the data previously read from the extent is transferred to a consumer (e.g., a replication appliance). Finally, the bit 206 is set to 0, indicating that the extent has been processed for the current delta operation. Once all of the marked bits in the primary bitmap have been processed and set to 0, the primary bitmap 210 is prepared to serve as the secondary bitmap during the next delta operation. When this occurs, the secondary bitmap 220 becomes the primary bitmap.

The next scenario is when the IO 222 is received for the extent associated with the index 266. In this scenario, the bit 208 is a 1 and the bit 218 is a 1—(1,1). This scenario should not occur and represents a consistency problem in which two overlapping IOs have been sent/received at the same time. It may not be possible to determine the order in which the overlapping IOs were generated. In this scenario, by way of example only, the previous IO may be allowed to finish and the next IO is then permitted.

Although the bit logic was illustrated with respect to four entries in the bitmaps, the bit logic is typically performed whenever the IO 222 is received during the process of generating a delta. More specifically, the bit logic is performed on the bits in the primary and secondary bitmaps associated with the address K of the IO 222 or otherwise impacted by the IO 222.

Advantageously, data included in a delta can be transferred in any order. More specifically, the bitmaps allow changes to data to be tracked with respect to non-overlapping extents on the volume 224. Thus, the order in which the data is read from the source or production volume 224 and transferred is not relevant. Further, the data's address is also transmitted such that the data can simply be applied to the target volume using the corresponding address.

More specifically, during a delta or transfer operation, the primary bitmap is scanned and data is stored in the extents of the volume corresponding to marked entries in the primary bitmap are transferred. IOs that are received during this delta operation are handled according to the bit logic discussed with respect to FIG. 2.

Figure 3:
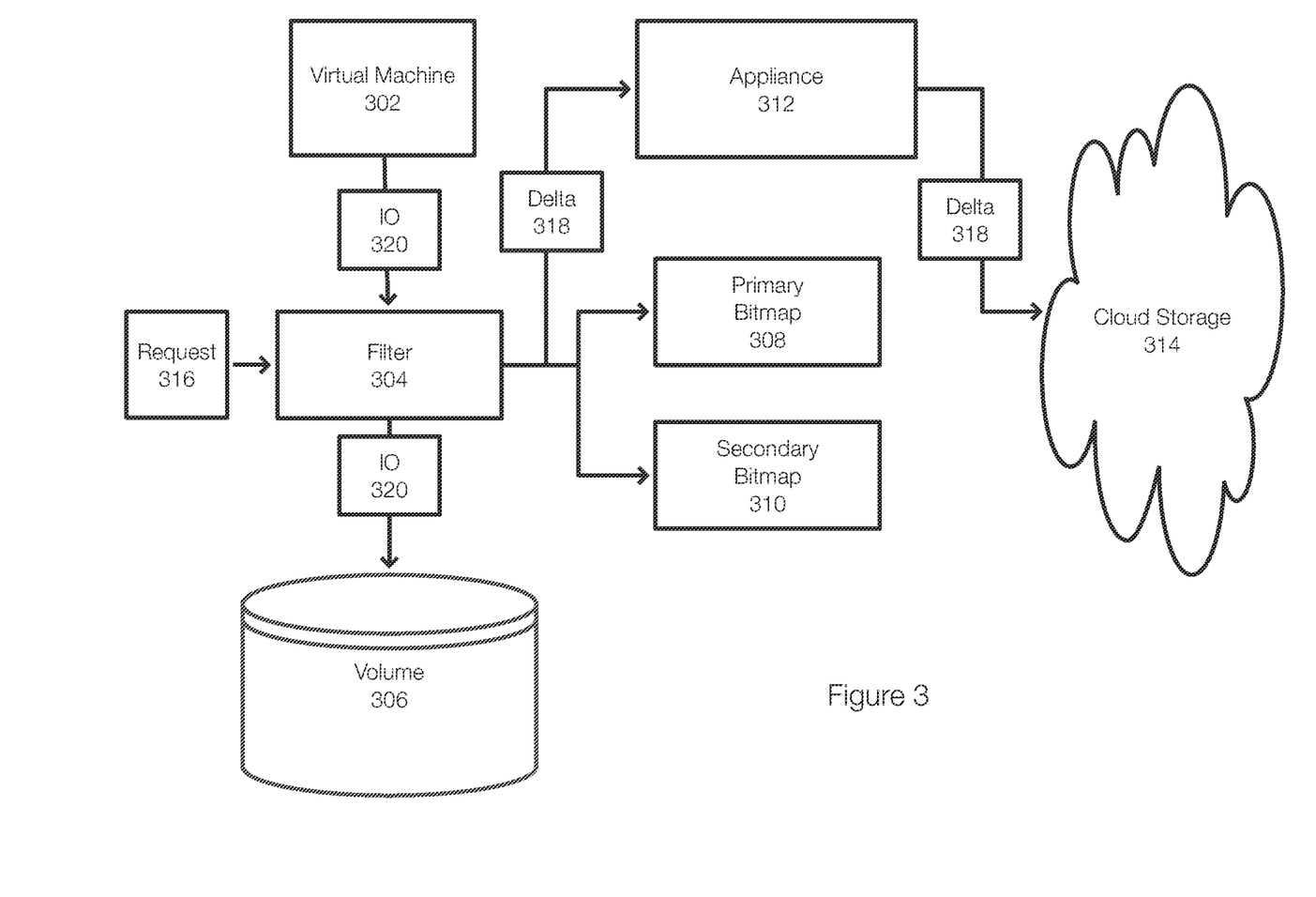
FIG. 3 discloses aspects of a data protection system configured to perform data protections including delta operations.

FIG. 3 discloses aspects of a data protection system configured to perform data protection operations including delta operations. The data protection system, by way of example, may include the appliance 312, the filter 304, the primary bitmap 308, and/or the secondary bitmap 310. The filter 304 may be implemented in the hypervisor of the virtual machine 302 and is able to intercept IOs from the virtual machine 302 to the volume 306.

FIG. 3 illustrates a virtual machine 302 (or physical machine, computing system, container) that may run an application. As IOs are generated (represented by 320), the IOs are transmitted to the volume 306 (or other storage). In this example, the filter 304 is configured to detect the IO 320 and then perform change block tracking using the address and size of the IO 320. Thus, the filter 304 may determine that the IO 320 is to be written to address K. The size allows the filter 304 to determine how many extents are affected by the IO 320. The entry or entries in the primary bitmap 308 are marked or changed from a 0 to a 1. In this example, a 1 indicates that the corresponding extent is dirty or needs to be backed up. This process continues until a request 316 or command to perform a delta operation is received. When an IO impacts multiple bits in the primary bitmap (e.g., address K, address K+1), the corresponding bits in the primary and secondary bitmaps are each considered independently as each may present a different scenario. The bit logic is applied to each pair of bits impacted by the IO because each pair may present a different scenario.

When the request 316 is received, the primary bitmap 308 is frozen with respect to IOs that occur after the request 316. The secondary bitmap 310 is used for IOs that happen after the request. Next, the primary bitmap 308 is processed in a single pass. The extents on the volume 306 corresponding to the marked entries in the primary bitmap 308 are read from the volume 306 and transferred to an appliance 312 as a delta 318. The delta 318, which typically includes a plurality of data corresponding to a plurality of extents, may also be transferred to cloud storage 314 or other target site. In one example, the target site is a cloud volume (e.g., a replica volume) that is configured to be like the volume 306. Thus, the extents in the delta 318, if desired, can be directly applied to the target volume regardless the order in which the data is received or packaged.

The primary bitmap 308 is processed in a single pass and only two bitmaps are required. This comparative reduction in complexity contributes to the ability to achieve an RPO on the order of seconds.

As the primary bitmap 308 is processed and extents corresponding to dirty bits are transferred in the delta 318, the corresponding entries in the primary bitmap are set to 0. Thus, once the delta operation has generated and transmitted the delta 318, all of the entries in the primary bitmap 308 are zero. At the same time, IOs are marked in the secondary bitmap. Thus, once the delta 318 has been transmitted, the secondary bitmap 310 becomes the primary bitmap and the primary bitmap becomes the secondary bitmap in preparation for the next request 316 to generate a delta.

Figure 4:
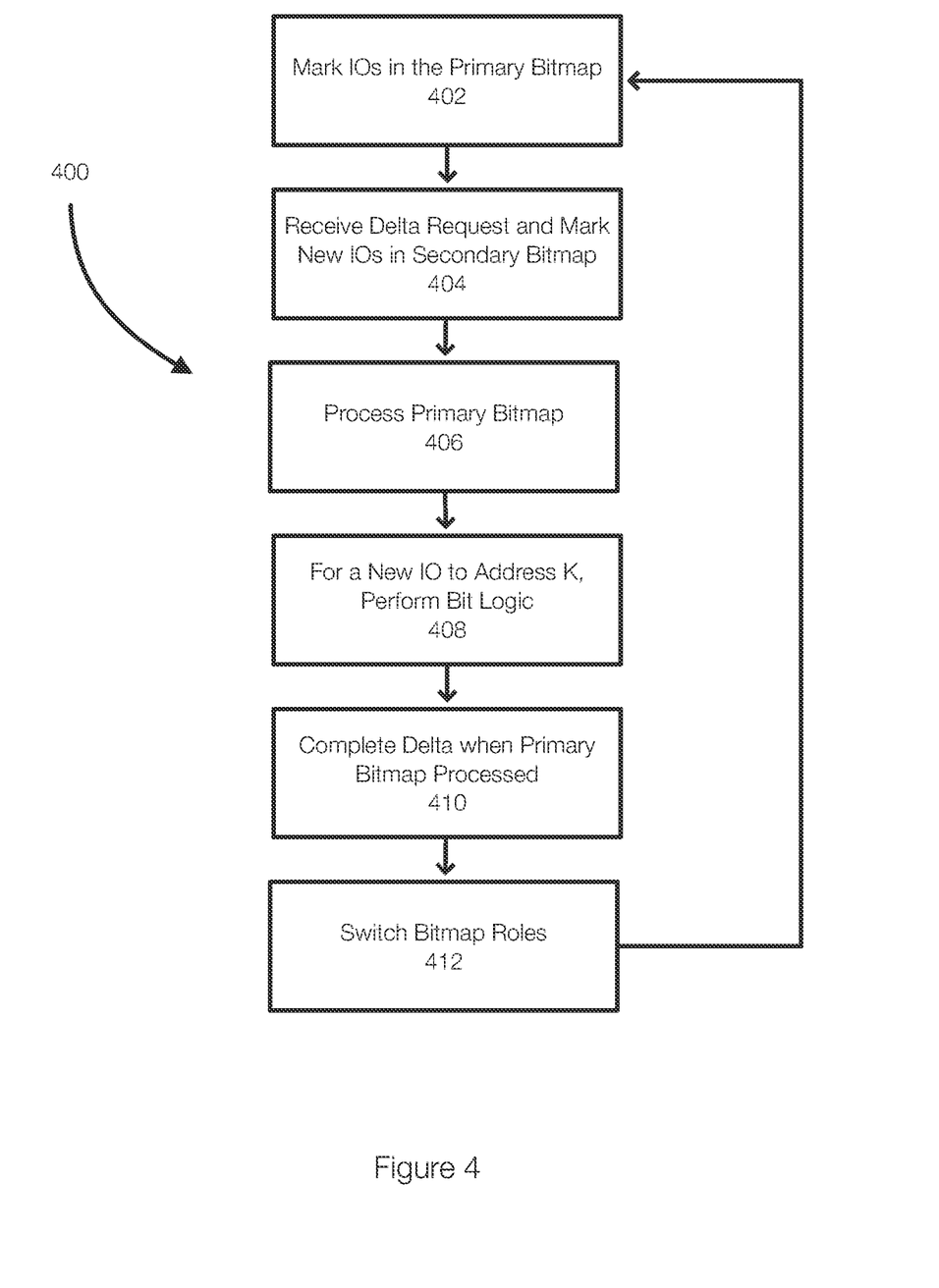
FIG. 4 discloses aspects of a flow diagram for a data protection operation or a delta operation.

FIG. 4 discloses aspects of a method for performing a delta operation. The method 400 may operate in the context of a virtual machine (physical machine, container, etc.) or an application therein is operating and sending IOs to a disk or volume. As IOs are generated and transmitted to the volume, the IOs are marked 402 in the primary bitmap. Thus, the primary bitmap identifies extents that have received writes or changes.

Next, a request to generate a delta is received and IOs subsequent to the delta request are marked in the secondary bitmap. Thus, the primary map is frozen with respect to a point in time and allows a backup to be generated for that point in time.

The primary bitmap is then processed 406 and changes since the last operation or data in the extents corresponding to marked bits in the primary bitmap are transmitted to a consumer, such as the appliance 312, and/or to a target site or device for storage.

Processing 406 the primary bitmap may include iterating the marked or dirty bits. As the primary bitmap is passed over, data in the extents corresponding to the marked bits is transmitted to a consumer along with the extent's address, index, and/or IO address. When the read operation related to a particular entry in the primary bitmap is completed, that particular entry is set to 0 so that the extent will not be processed again for the current delta operation.

When an IO is received during transmission for an address K, bit logic is performed 408 for that address or index.

Figure 5:
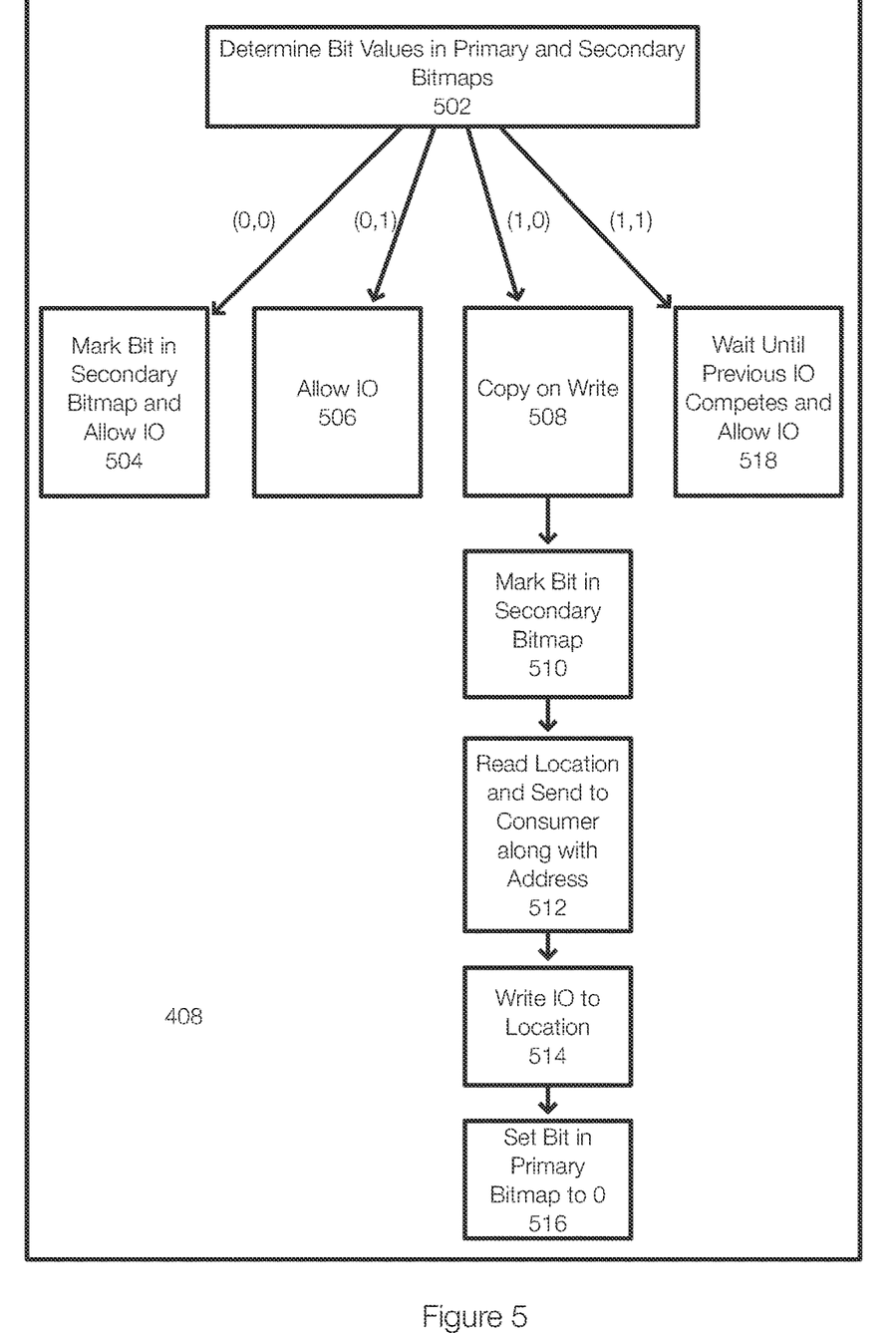
FIG. 5 discloses aspects of performing bit logic when transmitting processing a primary bitmap during a delta operation.

FIG. 5 discloses aspects of performing the bit logic. FIG. 5 discloses, more specifically, aspects of element 408 of the method 400. When a new IO is received for a location or extent being processed, referred to as an IO for address K in this example, the values of the bits in the primary and secondary bitmaps are evaluated. As previously described, there are four scenarios. For (0,0), the bit in the secondary bitmap for the address K is marked and the IO is allowed 504. For (0,1), the IO is simply allowed 506.

For (1,0), a copy on write 508 is performed. The copy on write 508 includes marking 510 the corresponding bit in the secondary bitmap. Then, data at the location or address on the volume or disk is read and sent 512, along with the address of the read, to a consumer. More specifically, data corresponding to the affected extents are transferred for inclusion in the delta being generated. The IO is then written 514 to the address or location and the bit in the primary bitmap is set 516 to 0.

For (1,1), this represents a collision where two IOs were sent to the same location in parallel. In this case, consistency may not be guaranteed. However, this situation can be avoided by proper programming in the application and in the IO stack. However, if the (1,1) scenario occurs, the method 400 waits for the bit in the primary bitmap to be set 516 to 0 for one of the IOs and the other IO is allowed to continue after the entry in the primary bitmap is set 516 to 0. More specifically, consistency is not guaranteed if the IOs actually overlap. This should be handled in the application or in the IO stack. However, two or more IOs may be directed to different portions of the same extent. Thus, the scenario of (1,1) can be handled as described. For the first IO, the copy on write is performed. The next IO can simply be allowed without performing the copy on write in this scenario.

When the primary bitmap is processed, the delta is completed 410 and transmitted to the consumer. The data associated with processing the primary bitmap may be transmitted as the data is read. A full delta may be assembled, if necessary, by the appliance or at another location. In one example, the delta is transmitted to the cloud storage or other target site.

Next, the roles of the bitmaps are switched 412. Thus, the secondary bitmap becomes the primary bitmap because incoming IOs are now being marked in the secondary bitmap. The primary bitmap becomes the secondary bitmap in anticipation of the next delta request.

Returning to FIG. 3, the consumer (e.g., the appliance 316) is typically responsible for transmitting the delta 318 to its target such as a local storage device, a network file system, a remote target for replication or backup, or the like or combination thereof. The appliance 316 may be physical, virtual, containerized, or the like.

The frequency with which deltas are created may depend on the throughput generated by the virtual machine 302, the speed in which data can be read from the volume 306, and/or the rate at which data can be transferred to the target.

When throughput of the virtual machine 302 is high, the amount of data that needs to be read and transmitted for a delta operation increases. Because read and transfer rates are often in the range of hundreds of megabytes per second, reading and transferred should only take a few seconds, after which another delta may be generated.

Embodiments of the invention also provide a mechanism to control the rate at which data is transferred. More specifically, the appliance 312 can control the rate at which data is transferred to the appliance 312 particularly because the appliance 312 may be sensitive to the amount of data that can be efficiently handled due to processor or memory constraints. This helps the appliance 312 avoid situations where there is not enough time to evacuate the data in memory (e.g., due to not enough bandwidth, communication disruption, or the like). In this situation, data will accumulate in memory in the appliance 312 and there may be a need to limit memory usage. Alternatively, the appliance may have free resources and may be able to handle an increased rate. Thus, embodiments of the invention allow the appliance to control the transfer rate and resource consumption.

This can be achieved, in one example, using an acknowledge rate. With an acknowledge rate, the appliance 312 can control when an acknowledgement is transmitted to the filter 340. Delaying the acknowledge allows the appliance 312 to slow down the rate at which data is received at the appliance 312.

In another example, the primary bitmap may be processed using multiple or parallel streams rather than serially. The parallelism can be controlled by exposing a property/setting/configuration on the appliance 312, or by calling a function to return the target parallelism value. A value of 5 indicates that 5 regions can be sent in parallel.

Slowing down the rate of data transmission results in a longer transmission time and, as a result, the next delta may include more changes or more data. However, embodiments of the invention allow resources to be controlled and managed effectively.

In general, embodiments of the invention may be implemented in connection with systems, software, and components, that individually and/or collectively implement, and/or cause the implementation of, data protection operations which may include, but are not limited to, delta operations, differential operations, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients (or modules, engines, filters, etc.) that are capable of collecting, modifying, transmitting, and creating, data. As such, a particular client may employ, or otherwise be associated with, one or more instances of each of one or more applications that perform such operations with respect to data. Such clients may comprise physical machines, virtual machines (VM), or containers.

Particularly, devices in the operating environment may take the form of software, physical machines, VMs, containers, or any combination of these, though no particular device implementation or configuration is required for any embodiment. Similarly, data protection system components such as databases, storage servers, storage volumes (LUNs), storage disks, replication services, filters, appliances and other consumers, backup servers, restore servers, backup clients, and restore clients, for example, may likewise take the form of software, physical machines or virtual machines (VM), though no particular component implementation is required for any embodiment.

As used herein, the term 'data' is intended to be broad in scope. Thus, that term embraces, by way of example and not limitation, data segments such as extents, blocks or such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental, delta, or differential backups.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a write at a filter operating between a device and a volume, marking an entry in a primary map based on an address of the write, the primary map including a plurality of entries, each entry corresponding to an extent of the volume, receiving a request to perform a delta operation, wherein writes subsequent to the request are marked in a secondary map and the primary map is frozen, processing the primary map to transfer data associated with the marked entries to a consumer, receiving a new write while processing the primary map, and performing bit logic that determines how the new write is handled in the volume, the primary map, and the secondary map.

Embodiment 2. The method of embodiment 1, wherein the bit logic includes, for the new write to a location on the volume, determining a value of a corresponding entry in the primary map and a corresponding entry in the secondary map.

Embodiment 3. The method of embodiment 1 and/or 2, when the corresponding entry in the primary map is clean and the corresponding entry in the secondary map is clean, further comprising marking the corresponding entry in the secondary map and allowing the new write to go to the volume.

Embodiment 4. The method of embodiment 1, 2 and/or 3, when the corresponding entry in the primary map is clean and the corresponding entry in the secondary map is dirty, further comprising allowing the new write to go to the volume.

Embodiment 5. The method of embodiment 1, 2, 3, and/or 4, when the corresponding entry in the primary map is dirty and the corresponding entry in the secondary map is clean, further comprising performing a copy on write that includes: marking the corresponding entry in the secondary map to dirty, reading data the location and sending the read data and an address of the read data to the consumer, writing the new write to the location, and setting the corresponding bit in the primary map to clean.

Embodiment 6. The method of embodiment 1, 2, 3, 4, and/or 5, when the corresponding entry in the primary map is dirty and the corresponding entry in the secondary map is dirty and a collision exists between the new write and a second new write, further comprising setting the corresponding bit in the primary map to clean for one of the new write and the second new write and then allowing the other of the new write and the second new write.

Embodiment 7. The method of embodiment 1, 2, 3, 4, 5, and/or 6, further comprising, when no new write is received while processing a marked entry in the primary map, setting the marked entry to 0 when the corresponding data in the volume has been read and/or transmitted to the consumer.

Embodiment 8. The method of embodiment 1, 2, 3, 4, 5, 6, and/or 7, further comprising setting the secondary map to be the primary map and setting the primary map to be the secondary map when all of the entries in the primary bitmap are clean.

Embodiment 9. The method of embodiment 1, 2, 3, 4, 5, 6, 7, and/or 8, further comprising performing flow control by the consumer based on available resources of the consumer, the resources including processor and memory resources.

Embodiment 10. The method of embodiment 1, 2, 3, 4, 5, 6, 7, 8, and/or 9, further comprising processing the primary map using parallel data streams.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
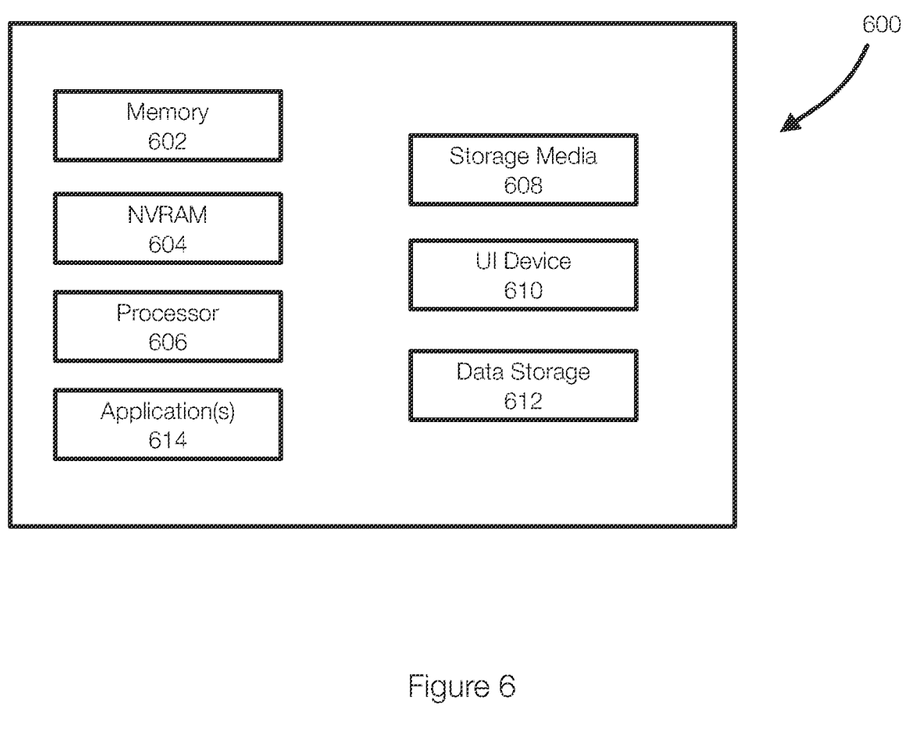
FIG. 6 discloses aspects of a computing device or of a computing system.

With reference briefly now to FIG. 6 any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a write at a filter operating between a device and a volume;
marking an entry in a primary map based on an address of the write, the primary map including a plurality of entries, each entry corresponding to an extent of the volume, wherein the extent has a fixed size;
receiving a request to perform a delta operation, wherein writes subsequent to the request are marked in a secondary map and the primary map is frozen;
processing the primary map to transfer data associated with the marked entries to a consumer;
receiving a new write while processing the primary map;
performing bit logic that determines how the new write is handled in the volume, the primary map, and the secondary map; and
setting the secondary map to be the primary map and setting the primary map to be the secondary map when all of the entries in the primary map are clean.

2. The method of claim 1, wherein the bit logic includes, for the new write to a location on the volume, determining a value of a corresponding entry in the primary map and a corresponding entry in the secondary map.

3. The method of claim 2, when the corresponding entry in the primary map is a clean and the corresponding entry in the secondary map is dirty, further comprising marking the corresponding entry in the secondary map and allowing the new write to go to the volume.

4. The method of claim 2, when the corresponding entry in the primary map is clean and the corresponding entry in the secondary map is dirty, further comprising allowing the new write to go to the volume.

5. The method of claim 2, when the corresponding entry in the primary map is dirty and the corresponding entry in the secondary map is clean, further comprising performing a copy on write that includes:
   marking the corresponding entry in the secondary map as dirty, reading data from the extent corresponding to the location and sending the read data and an address of the read data and/or the extent to the consumer;
   writing the new write to the location; and
   setting the corresponding bit in the primary map as clean.

6. The method of claim 2, when the corresponding entry in the primary map is dirty and the corresponding entry in the secondary map is dirty and a collision exists between the new write and a second new write, further comprising setting the corresponding bit in the primary map to clean for one of the new write and the second new write and then allowing the other of the new write and the second new write.

7. The method of claim 1, further comprising, when no new write is received while processing a marked entry in the primary map, setting the marked entry as clean when the corresponding data in the volume has been read and/or transmitted to the consumer.

8. The method of claim 1, further comprising performing flow control by the consumer based on available resources of the consumer, the resources including processor and memory resources.

9. The method of claim 8, further comprising processing the primary map using parallel data streams.

10. A non-transitory storage medium having stored therein instructions that are executable by one or more hardware processors to perform operations comprising:
   receiving a write at a filter operating between a device and a volume;
   marking an entry in a primary map based on an address of the write, the primary map including a plurality of entries, each entry corresponding to an extent of the volume, wherein the extent has a fixed size;
   receiving a request to perform a delta operation, wherein writes subsequent to the request are marked in a secondary map and the primary map is frozen;
   processing the primary map to transfer data associated with the marked entries to a consumer;
   receiving a new write while processing the primary map;
   performing bit logic that determines how the new write is handled in the volume, the primary map, and the secondary map; and
   setting the secondary map to be the primary map and setting the primary map to be the secondary map when all of the entries in the primary map are clean.

11. The non-transitory storage medium of claim 10, wherein the bit logic includes, for the new write to a location on the volume, determining a value of a corresponding entry in the primary map and a corresponding entry in the secondary map.

12. The non-transitory storage medium of claim 10, when the corresponding entry in the primary map is a clean and the corresponding entry in the secondary map is dirty, further comprising marking the corresponding entry in the secondary map and allowing the new write to go to the volume.

13. The non-transitory storage medium of claim 11, when the corresponding entry in the primary map is clean and the corresponding entry in the secondary map is dirty, further comprising allowing the new write to go to the volume.

14. The non-transitory storage medium of claim 11, when the corresponding entry in the primary map is dirty and the corresponding entry in the secondary map is clean, further comprising performing a copy on write that includes:
   marking the corresponding entry in the secondary map as dirty, reading data from the extent corresponding to the location and sending the read data and an address of the read data and/or the extent to the consumer;
   writing the new write to the location; and
   setting the corresponding bit in the primary map as clean.

15. The non-transitory storage medium of claim 11, when the corresponding entry in the primary map is dirty and the corresponding entry in the secondary map is dirty and a collision exists between the new write and a second new write, further comprising setting the corresponding bit in the primary map to clean for one of the new write and the second new write and then allowing the other of the new write and the second new write.

16. The non-transitory storage medium of claim 10, further comprising, when no new write is received while processing a marked entry in the primary map, setting the marked entry as clean when the corresponding data in the volume has been read and/or transmitted to the consumer.

17. The non-transitory storage medium of claim 10, further comprising performing flow control by the consumer based on available resources of the consumer, the resources including processor and memory resources.

18. The non-transitory storage medium of claim 17, further comprising processing the primary map using parallel data streams.

* * * * *